US008341006B2

(12) United States Patent
Lin et al.

(10) Patent No.: US 8,341,006 B2
(45) Date of Patent: Dec. 25, 2012

(54) SYSTEM AND METHOD FOR PRODUCT RECOMMENDATION AND AUTOMATIC SERVICE EQUIPMENT THEREOF AND COMPUTER READABLE RECORDING MEDIUM STORING COMPUTER PROGRAM PERFORMING THE METHOD

(75) Inventors: Yu-Fan Lin, Taipei (TW); Hui-Wen Yang, Taipei County (TW); Chang-Yi Kao, Taipei (TW); Bing-Hui Lu, Taipei County (TW)

(73) Assignee: Institute for Information Industry, Taipei (TW)

( * ) Notice: Subject to any disclaimer, the term of this patent is extended or adjusted under 35 U.S.C. 154(b) by 390 days.

(21) Appl. No.: 12/637,760

(22) Filed: Dec. 15, 2009

(65) Prior Publication Data

US 2011/0119110 A1 May 19, 2011

(30) Foreign Application Priority Data

Nov. 17, 2009 (TW) .............................. 98139019 A

(51) Int. Cl.
*G06Q 10/00* (2012.01)
(52) U.S. Cl. .................... 705/7.29; 705/7.25; 705/7.33; 705/14.49; 703/2
(58) Field of Classification Search ........................ None
See application file for complete search history.

(56) References Cited

U.S. PATENT DOCUMENTS

| 7,069,234 B1* | 6/2006 | Cornelius et al. ............... 705/80 |
| 7,610,233 B1* | 10/2009 | Leong et al. .................... 705/37 |
| 7,953,645 B2* | 5/2011 | Kerker et al. ................ 705/26.1 |
| 2002/0161561 A1* | 10/2002 | Sarma et al. ...................... 703/2 |
| 2005/0204381 A1* | 9/2005 | Ludvig et al. ................... 725/34 |
| 2006/0178918 A1* | 8/2006 | Mikurak ............................. 705/7 |
| 2008/0319829 A1* | 12/2008 | Hunt et al. ...................... 705/10 |
| 2009/0006156 A1* | 1/2009 | Hunt et al. ........................ 705/7 |
| 2009/0018996 A1* | 1/2009 | Hunt et al. ....................... 707/2 |
| 2009/0234716 A1* | 9/2009 | Mallick et al. ................. 705/10 |
| 2010/0049538 A1* | 2/2010 | Frazer et al. ..................... 705/1 |
| 2010/0179860 A1* | 7/2010 | Noel et al. ...................... 705/10 |

OTHER PUBLICATIONS

Dickinson, J.. The role of business process capabilities and market-based assets in creating customer value and superior performance. Ph.D. dissertation, Drexel University, United States—Pennsylvania.*
The 1996 software guide: Targeting and reaching the right customers more effectively. (Jun. 1996). Direct Marketing, 59(2), 34.*

(Continued)

*Primary Examiner* — Gurkanwaljit Singh
(74) *Attorney, Agent, or Firm* — CKC & Partners Co., Ltd.

(57) ABSTRACT

A system for product recommendation comprises several automatic service equipments which are mutually linked via a communication network. Each of the automatic service equipments obtains data of other user groups, data of other product groups and other, relation matrixes from other automatic service equipments. Each of the automatic service equipments integrates data of other user groups into data of local user groups stored in itself, and also integrates data of other product groups into data of local product groups stored in itself. Each of the automatic service equipments revises a local relation matrix stored in itself, such that the revised local relation matrix records correlation coefficients between the integrated local user groups and the integrated local product groups. Each of the automatic service equipments performs product recommendation according to the integrated data and input data received through an input device.

22 Claims, 3 Drawing Sheets

OTHER PUBLICATIONS

Pradeep Korgaonkar, & Lori D Wolin. (2002). Web usage, advertising, and shopping: Relationship patterns. Internet Research, 12(2), 191-204.*

Jia Hu, & Ning Zhong. (2006). Organizing Multiple Data Sources for Developing Intelligent e-Business Portals. Data Mining and Knowledge Discovery, 12(2-3), 127-150.*

Jackson, Harold Vaughn, Jr. (1999). A structured approach for classifying and prioritizing product requirements. Ph.D. dissertation, North Carolina State University, United States—North Carolina.*

Gregory R Heim, & Kingshuk K Sinha. (2001). A product-process matrix for electronic B2C operations: Implications for the delivery of customer value. Journal of Service Research : JSR, 3(4), 286-299.*

* cited by examiner

SYSTEM AND METHOD FOR PRODUCT RECOMMENDATION AND AUTOMATIC SERVICE EQUIPMENT THEREOF AND COMPUTER READABLE RECORDING MEDIUM STORING COMPUTER PROGRAM PERFORMING THE METHOD

RELATED APPLICATIONS

This application claims priority to Taiwan Application Serial Number 98139019, filed Nov. 17, 2009, which is herein incorporated by reference.

BACKGROUND

1. Field of Invention

The present invention relates to a system, a method for production recommendation, and its automatic service equipment.

2. Description of Related Art

Under cross influences of the diversified factors such as limited space, uprising manpower cost and daily increased customer demands, to establish automatic service channels has become one of the operation modes which has the greatest capability of lowering cost. Through an automatic service equipment, a consumer may control a transaction process in person, so that the transaction process from selecting articles to checking out can be done without clerk's assistance, thus not only resolving the bothering of long waiting-lines but also reducing the time for waiting in lines. As to a business owner, the automatic service equipment can overcome the troubles caused by limited space and uprising manpower cost. Hence, vendors develop various types of automatic service equipment such as vending machines, multi-media browsing machines, and digital bulletins, etc., with respect to various demands.

With progress and innovation in technologies, the automatic service equipment has been developed with more new functions, such as a recommendation mechanism. Through the recommendation mechanism, the automatic service equipment can recommend appropriate products to consumers for selection. As a result, the buying desires of consumers can be promoted, thus increasing sale results.

In the past, a processing device of the automatic service equipment itself has limited computation capability. Thus, the automatic service equipment needs to send data inputted by a consumer to a remote central server for computation via a network connection, thereby generating product information of recommendation to the consumer. However, when the remote central server is crashed or the network connection between the automatic service equipment and the remote central server is broken, the remote central server cannot compute according to the consumer data provided by the automatic service equipment, and thus the automatic service equipment fails to perform the recommendation function. Besides, when the automatic service equipment is installed, both of the central server and the automatic service equipment have to be configured, thus resulting a relatively complicated configuration process.

SUMMARY

Hence, an aspect of the present invention is to provide a system for product recommendation. In the system for product recommendation, each automatic service equipment obtains data of user groups, data of product groups and relation matrixes between the user groups and the product groups from other automatic service equipments, and then combines them with data of user groups, data of product groups and a relation matrix stored in a local automatic service equipment respectively as a base for product recommendation. The system for product recommendation comprises a plurality of automatic service equipments. Each automatic service equipment is linked to the other automatic service equipments via a communication network. Each automatic service equipment comprises a storage device, an input device and a processing device. The storage device has a plurality of first user groups, data of a plurality of first product groups, a relation matrix and a reliance list stored therein. The relation matrix is used to record correlation coefficients between the first user groups and the first product groups, and the reliance list comprises network connection data of the other automatic service equipments, and the input device is used to receive input data. The processing device is electrically connected to the storage device and the input device, and comprises a data obtaining module, a group integration module, a matrix-revising module and a recommendation module. The data obtaining module is used to respectively obtain data of other first user groups, data of other first product groups and other relation matrixes from the other automatic service equipments via the communication network in accordance with the network connection data of the other automatic service equipments recorded in the reliance list. The group integration module is used to integrate the data of the other first user groups into the data of the first user groups, and to integrate the data of the other first product groups into the data of the first product groups. The matrix-revising module is used to revise the relation matrix stored in the local automatic service equipment in accordance with the data of the integrated first user groups, the data of the integrated first product groups, the other relation matrixes and the relation matrix stored in the local automatic service equipment, thereby enabling the revised relation matrix to record the correlation coefficients between the integrated first user groups and the integrated first product groups. The recommendation module is used to provide data of at least one recommended product in accordance with the data of the integrated first user groups, the data of the integrated first product groups, and the revised relation matrix.

Another aspect of the present invention is to provide a method for product recommendation. In the method for product recommendation, each automatic service equipment obtains data of user groups, data of product groups and relation matrixes between the user groups and the product groups from other automatic service equipments, and then combines data of user groups, data of product groups and a relation matrix stored in a local automatic service equipment as a base for product recommendation. The method for product recommendation is suitable for use between a plurality of automatic service equipments, wherein each automatic service equipment is linked to other automatic service equipments via a communication network, each of the automatic service equipments having a plurality of first user groups, data of a plurality of first product groups, a relation matrix and a reliance list stored therein, wherein the relation matrix is used to record correlation coefficients between the first user groups and the first product groups, and the reliance list comprises network connection data of the other automatic service equipments. The method for product recommendation is performed by a local automatic service equipment of the automatic service equipments, and comprises: respectively obtaining data of other first user groups, data of other first product groups and other relation matrixes from the other automatic service equipments via the communication network in accordance with the network connection data of the other automatic service equipments recorded in the reliance list; integrating the data of the other first user groups into the data of the first user groups in the local automatic service equipment, and integrating the data of the other first product groups into the data of the first product groups in the local automatic service equipment; revising the relation matrix stored in the local automatic service equipment in accordance with the data of the integrated first user groups, the data of the integrated first product groups, the other relation matrixes and the relation matrix stored in the local automatic service equipment, thereby enabling the revised relation matrix to record the correlation coefficients between the integrated first user groups and the integrated first product groups; and receiving input data and providing data of at least one recommended product in accordance with the data of the integrated first user groups, the data of the integrated first product groups, and the revised relation matrix.

Another aspect of the present invention is to provide an automatic service equipment used to obtain data of user groups, data of product groups and relation matrixes between the user groups and the product groups from other automatic service equipments, and then combines data of user groups, data of product groups and a relation matrix stored in a local automatic service equipment as a base for product recommendation. The automatic service equipment comprises a network device, a storage device, an input device and a processing device. The network device is used to establish a connection with a communication network. The storage device has data of a plurality of local user groups, data of a plurality of local product groups, a local relation matrix and a reliance list stored therein, wherein the local relation matrix is used to record correlation coefficients between the local user groups and the local product groups, and the reliance list comprises network connection data of a plurality of other automatic service equipments. The processing device is electrically connected to the storage device and the input device. The processing device comprises a data obtaining module, a group integration module, a matrix-revising module and a recommendation module. The data obtaining module is used to respectively obtain data of a plurality of other user groups, data of a plurality of other product groups and a plurality of other relation matrixes from the other automatic service equipments via the communication network in accordance with the network connection data of the other automatic service equipments recorded in the reliance list, wherein the other relation matrixes are used to record correlation coefficients between the other user groups and the other product groups. The group integration module is used to integrate the data of the other user groups into the data of the local user groups, and to integrate the data of the other product groups into the data of the local product groups. The matrix-revising module is used to revise the local relation matrix in accordance with the data of the integrated local user groups, the data of the integrated local product groups, the other relation matrixes and the local relation matrix, thereby enabling the revised local relation matrix to record the correlation coefficients between the integrated local user groups and the integrated local product groups. The recommendation module is used to provide data of at least one recommended product in accordance with the data of the integrated local user groups, the data of the integrated local product groups, and the revised relation matrix.

Another aspect of the present invention is to provide a computer-readable recording medium storing a computer program performing a method for product recommendation. In the method for product recommendation, each automatic service equipment obtains data of user groups, data of product groups and relation matrixes between the user groups and the product groups from other automatic service equipments, and then combines data of user groups, data of product groups and a relation matrix stored in a local automatic service equipment as a base for product recommendation. The method for product recommendation is suitable for use between a plurality of automatic service equipments, wherein each automatic service equipment is linked to other automatic service equipments via a communication network, each of the automatic service equipments having a plurality of first user groups, data of a plurality of first product groups, a relation matrix and a reliance list stored therein, wherein the relation matrix is used to record correlation coefficients between the first user groups and the first product groups, and the reliance list comprises network connection data of the other automatic service equipments. The method for product recommendation is performed by a local automatic service equipment of the automatic service equipments, and comprises: respectively obtaining data of other first user groups, data of other first product groups and other relation matrixes from the other automatic service equipments via the communication network in accordance with the network connection data of the other automatic service equipments recorded in the reliance list; integrating the data of the other first user groups into the data of the first user groups in the local automatic service equipment, and integrating the data of the other first product groups into the data of the first product groups in the local automatic service equipment; revising the relation matrix stored in the local automatic service equipment in accordance with the data of the integrated first user groups, the data of the integrated first product groups, the other relation matrixes and the relation matrix stored in the local automatic service equipment, thereby enabling the revised relation matrix to record the correlation coefficients between the integrated first user groups and the integrated first product groups; and receiving input data and providing data of at least one recommended product in accordance with the data of the integrated first user groups, the data of the integrated first product groups, and the revised relation matrix.

It can be known from the aforementioned embodiments of the present invention that the applications of the present invention have the following advantages. Each automatic service equipment may base on data of other automatic service equipments to perform recommendation without needing to install a central server additionally for performing the computation of product recommendation, thus avoiding the shortcoming of the automatic service equipment failing to perform the recommendation function due to the central sever down or the interruption of a network linked to the central server. Further, the data obtained form the other automatic service equipments are clustered data, and are quite small in quantity, and thus can transmitted rapidly through the network. Further, when the computation of product recommendation is performed by using the clustered data, it does not need strong operation capability to perform the computation of product recommendation since the clustered data are quite small in quantity. In other words, the present invention is suitable for use in various types of automatic service equipment using industrial personal computers with less processing capabilities.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
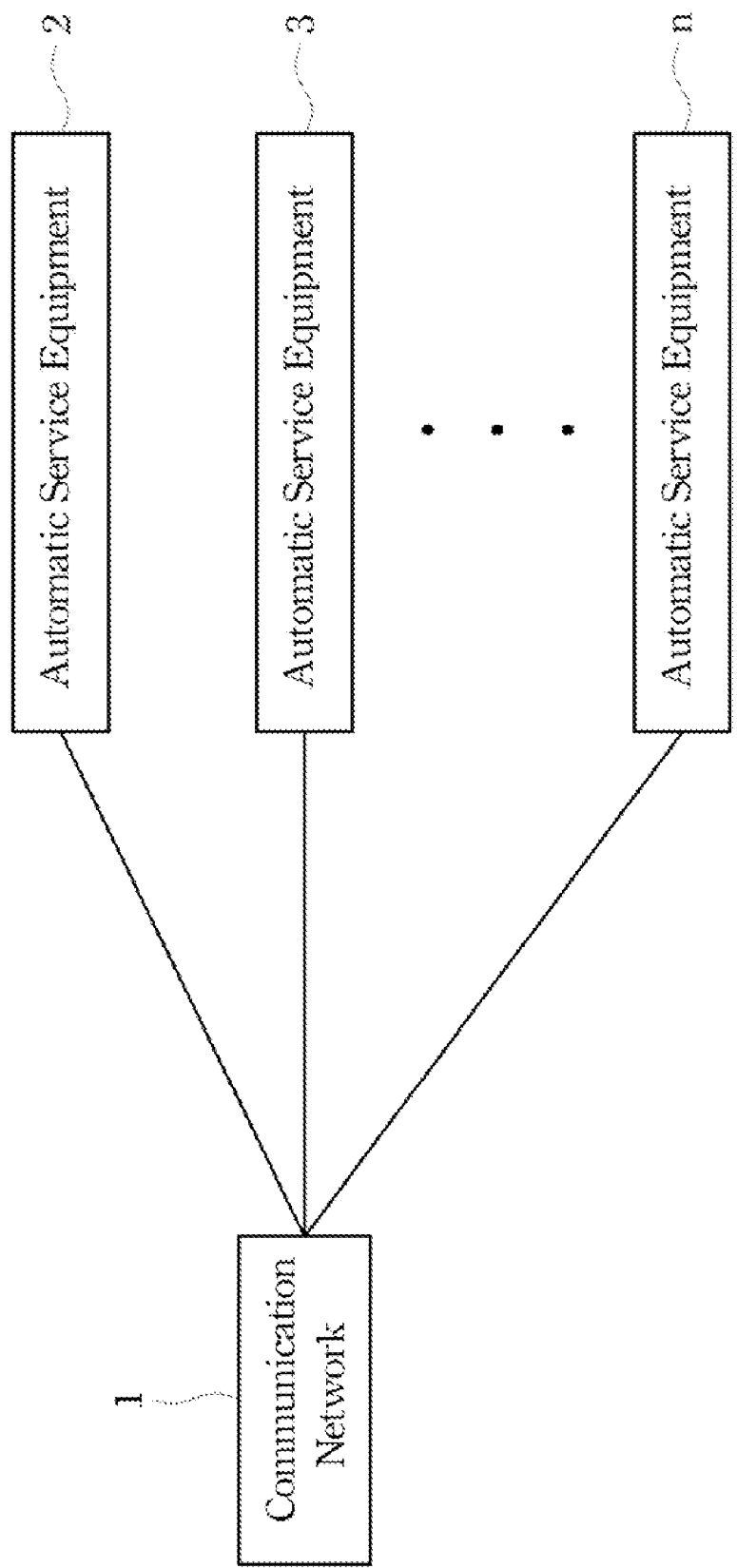
FIG. 1 is a functional block diagram showing a system for product recommendation according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
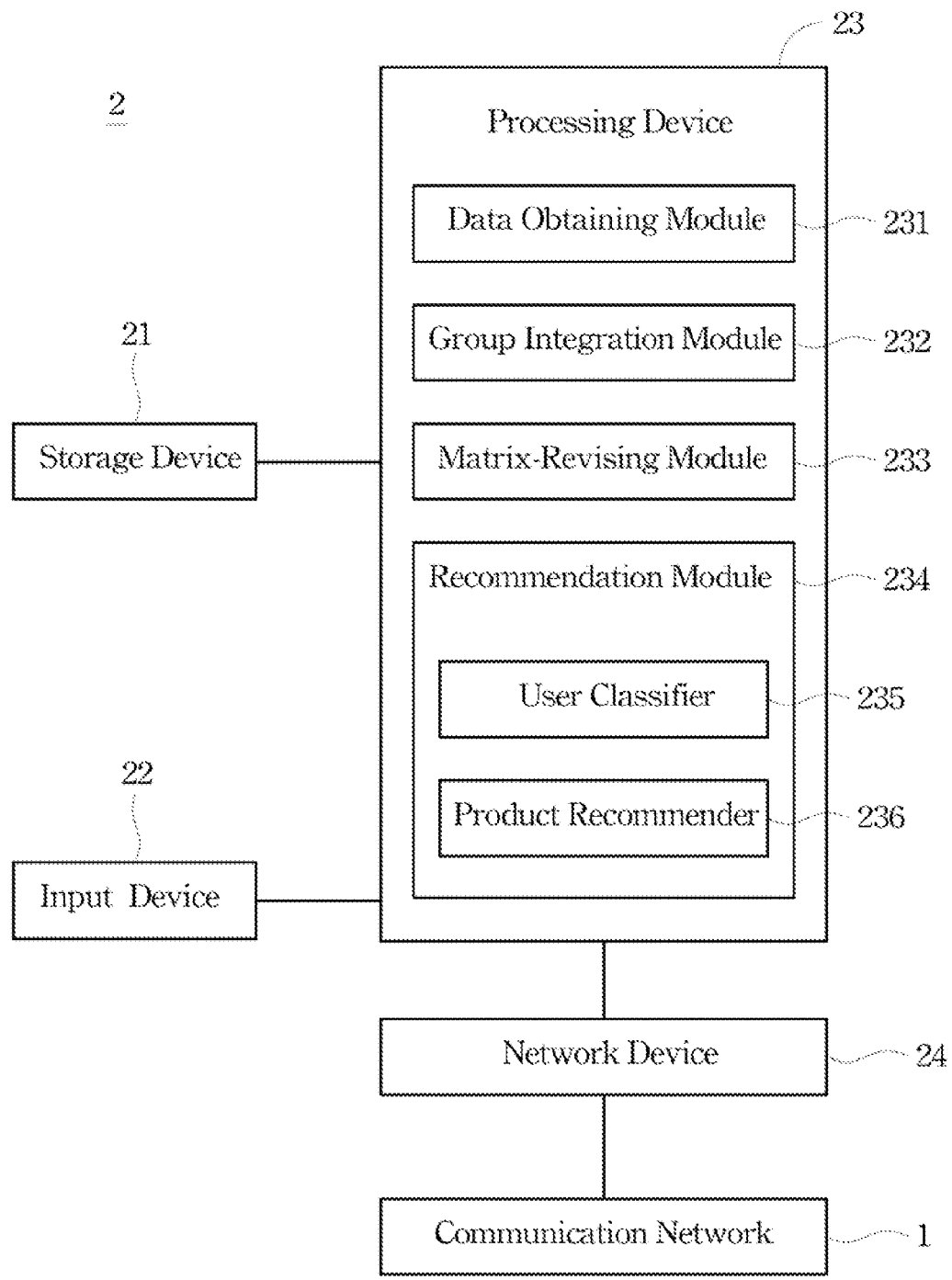
FIG. 2 is a functional block diagram illustrating an embodiment of an automatic service equipment shown in FIG. 1.

Referring to FIG. 1, FIG. 1 is a functional block diagram showing a system for product recommendation according to an embodiment of the present invention. The system for product recommendation comprises a plurality of automatic service equipments 2, 3, . . . n, wherein the automatic service equipments 2, 3, . . . n can be vending machines, multi-media browsing machines, and digital bulletins, information service equipments, KIOSKs, automatic teller machines or other types of automatic service equipment providing service by using industrial personal computers. FIG. 2 is a functional block diagram illustrating an embodiment of an automatic service equipment shown in FIG. 1.

In the system for product recommendation, besides providing the original self-serve service such as automatically selling merchandise, providing multimedia information, providing information inquiry or transaction service, etc., each of the automatic service equipments 2, 3, . . . n also has stored therein a plurality of first user groups, data of a plurality of first product groups, a relation matrix and a reliance list, and can obtain data of user groups, data of product groups and relation matrixes between the user groups and the product groups from other automatic service equipments, and combines data of user groups, data of product groups and a relation matrix between the user groups and the product groups stored in the local automatic service equipment as a base for product recommendation. For example, referring to FIG. 1 and FIG. 2, when the automatic service equipment 2 receives a recommendation request, the automatic service equipment 2 obtains data of user groups, data of product groups and relation matrixes between the user groups and the product groups from other automatic service equipments 3 . . . n, and combines data of user groups, data of product groups and a relation matrix between the user groups and the product groups stored in the local automatic service equipment (i.e. the automatic service equipment 2) as a base for product recommendation performed by the automatic service equipment 2.

The automatic service equipment 2 comprises a storage device 21, an input device 22, a processing device 23 and a network device 24, wherein the processing device 23 is electrically connected to the storage device 21, the input device 22 and the network device 24. The input device 22 can be a mouse, a keyboard, a touch panel or any other input device provided for a user to input data. Further, the automatic service equipment 2 may comprise an out device (not shown), such as a display, a touch screen, a speaker or a pickup mechanism, etc., used for outputting related information or articles such as recommended product information or a recommended product itself. Further, the aforementioned devices such as the storage device 21, the input device 22, and the processing device 23 can be original devices of an automatic service equipment, or additional devices exclusively used for performing production recommendation.

The network device 24 establishes a connection with a communication network 1, and can be a wired network device, a wireless network device or any other device which can provide a connection with the communication network 1.

The storage device 21 has stored therein data of a plurality of local user groups, data of a plurality of local product groups, a local relation matrix and a reliance list, wherein the local user groups can be formed by clustering the local users which have ever used the automatic service equipment 2, and the local product groups can be formed by clustering the local products which can be provided by the automatic service equipment 2. The data of each local user group are preferably data of a user's centroid used for representing data of a plurality of local users in the each local user group. An average of data of a plurality of local users in one same user group can be used as the data of the one same user group. In other words, when the data of a local user group represents an average age of 23 years old of a plurality of local users, it can be considered that there is only one 23-year-old virtual user (or referred to as a local user's centroid) existing in the local user group. However, in other embodiments, the data of a local user group can represent the age, height, weight or other user related data (which can be numericalized) of a virtual user (user's centroid) in the local user group. Besides, the embodiments of the present invention may numericalize genders, occupations, home address areas or other user related data of the respective local users, and then use the averages of the numericalized data of the local users in the same local user group as the data of the local user group to which the local users belong. Therefore, a large amount of data of users can be greatly reduced to a small amount of data of few user groups, such as user's centroids. The data of the user groups also can be specific categories determined in advance, and each of the local users is classified to a specific group based on the specific categories in accordance with certain rules.

Further, the data of each local product group are data of a product's centroid used for representing data of a plurality of local products in the each local product group. For example, an average of data of a plurality of local products in one same product group can be used as the data of the one same product group. In other words, when a local product group contains a plurality of local product with an average capacity of 1 liter, it can be considered that there is only one virtual product (or referred to as a product's centroid) with the capacity of 1 liter existing in the local user group. However, in other embodiments, the data of a local product group can represent the weight, capacity, price or other user related data (which can be numericalized) of a virtual product (product's centroid) in the local user group. Besides, the embodiments of the present invention may numericalize brands, model numbers, model types or other product related data of the respective local products, and then use the averages of the numericalized data of the local products in the same local product group as the data of the local product group to which the local products belong. Therefore, a large amount of data of products can be greatly reduced to a small amount of data of few product groups, such as product's centroids.

The relation matrix records correlation coefficients between the local user groups and the local product groups. Further, the probabilities of selecting the local product groups by the local user groups can be used as the correlation coefficients. For example, when the probability that a local user group u1 will select a local product group p1 is 0.5, the correlation coefficient between the local user group u1 and the local product group p1 can be assigned to 0.5. However, in other embodiments, other related parameters between the local user groups and the local product groups can be used as correlation coefficients, and thus the embodiments of the present invention are not limited thereto.

The reliance list comprises network connection data of the other automatic service equipments 3 . . . n, such as IP addresses, web addresses, web domains or other data related to network connections, and is used as a base for establishing connections to the other automatic service equipments 3 . . . n, wherein the reliance list can be automatically built and updated in accordance with a certificate, or can be built and updated by an administer, and stored in the storage device 21. The certificate contains the information regarding the network connection data of the other automatic service equipments 3 . . . n, and can be a digital certificate (which is encrypted by encryption software and stored in the storage device 21), or a hardware certificate (used for storing as encryption key and comprises an IC card of hardware encryptor, a flash memory, a USB or other type of storage media), such as GnuPG (GNU Privacy Guard, an encryption freeware with open source codes designed in accordance with the OpenPGP standard defined by IETF); a PGP encryption and/or signature toolkit (using IDEA algorithm with commercial copyright and collecting PGPdisk tools with commercial copyright); or a NOVELL certificate server and eDirectory, cv act PKIntegrated, etc.

The processing device 23 comprises a data obtaining module 231, a group integration module 232, a matrix-revising module 233 and a recommendation module 234. The data obtaining module 231 bases on the network connection data of the other automatic service equipments 3, . . . n recorded in the reliance list, to respectively obtain data of the other user groups, data of the other product groups and other relation matrixes from the other automatic service equipments 3, . . . n via the communication network 1. The data of the other user groups, the data of the other product groups and the other relation matrixes obtained from the other automatic service equipments 3, . . . n are the data of the local user groups, the data of the local product groups and the local relation matrixes respectively belonging to the other automatic service equipments 3, . . . n. Further, the other user groups can be formed by clustering the other users which have ever used the respective other automatic service equipments 3, . . . , n, and the other product groups can be formed by clustering the other products which can be provided by the other automatic service equipments 3, . . . n respectively. Hence, the number of the other user groups in the other automatic service equipments 3, . . . , n is much smaller than that of the other users therein, and the number of the other product groups in the other automatic service equipments 3, . . . , n is much smaller than that of the other products therein. Further, the data of the other user groups and the data of the other product groups are preferably represented by the data of user's centroids and the data of product's centroids respectively. Besides, the data of the other user groups stored in the respective other automatic service equipments are totally the same clustered data, partially the same clustered data or totally different clustered data; and the data of the other product groups stored in the automatic service equipments are totally the same clustered data, partially the same clustered data or totally different clustered data. Thus, by clustering the data of users and the data of products and representing them by the data of their centroids, their data size can be greatly reduced, so that the data of the other user groups and the data of product groups can be transmitted rapidly through a network.

The group integration module 232 integrates the data of the other user groups into the data of the local user groups stored in the storage device 21 of the automatic service equipment 2, and integrates the data of the other product groups into the data of the local product groups stored in the storage device 21 of the (local) automatic service equipment 2, wherein the group integration module 232 bases on the user's centroids of the local and other user groups to perform integration, and merges the user groups of which the user's centroids are located closely. In other words, the group integration module 232 can integrate the local and other user groups of which the data attributes are similar as new local user groups, and base on the data of the local and other user groups to compute user's centroids of the new local user groups as the data of the integrated (new) local user groups. Further, the data of each of the local and other user groups are corresponding to the data of one of the integrated user groups.

Further, the group integration module 232 also can base on the product's centroids of the local and other product groups to perform integration, and merge the product groups of which the product's centroids are located closely. In other words, the group integration module 232 also can integrate the local and other product groups of which the data attributes are similar as new local product groups, and base on the data of the local and other product groups to compute product's centroids of the new local product groups as the data of the integrated (new) local product groups. Further, the data of each of the local and other product groups are corresponding to the data of one of the integrated product groups.

The matrix-revising module 233 revises the relation matrix stored in the storage device 21 of the (local) automatic service equipment 2 in accordance with the data of the integrated user groups, the data of the integrated product groups, the other relation matrixes and the relation matrix stored in the (local) automatic service equipment 2, thereby enabling the revised relation matrix to record the correlation coefficients between the integrated first user groups and the integrated first product groups.

The recommendation module 234 receives input data via the input device 220, and bases on the data of the integrated first user groups, the data of the integrated first product groups, and the revised relation matrix, to provide data of at least one recommended product. Therefore, the data of the recommended product can be used to assist users to perform product selection through the automatic service equipment 2.

Further, the automatic service equipment 2 can record the information of users and the products selected by the users as a base for product recommendation. Thus, the storage device 21 of the automatic service equipment 2 has stored therein data of a plurality of local products or users, wherein each of the local products is classified to one of the local product groups. Further, when the data of the other product groups are integrated into the data of the local product groups stored in the storage device 21, the group integration module 232 classifies each of the local products to one of the integrated product groups. Each of the local users is classified to one of the local users groups. When the data of the other user groups are integrated into the data of the local user groups stored in the storage device 21, the group integration module 232 classifies each of the local users to one of the integrated user groups.

The recommendation module 234 may base on various data inputted by users to perform recommendation. Thus, the recommendation module 234 may comprise a user classifier 235 and a product recommender 236. When the input data entered by a current user using the input device 22 comprise data of the current user, the user classifier 234 bases on the data of the current user to classify the current user to a current user group which is one of the integrated local user groups. The product recommender 236 bases on the current user group to inquire the revised local relation matrix, so as to select a product group having a maximum correlation coefficient with respect to the current user group as a recommended product group from the integrated local product groups. If the local products in the (recommended) product group having the maximum correlation coefficient have been sold out, then another product group having a second maximum correlation coefficient with respect to the current user group is used as the recommended product group. On the analogy of this, if the local products in the recommended product group newly selected also have been sold out, then another product group having a next maximum correlation coefficient will be used as the recommended product group.

Thereafter, the product recommender 236 selects at least one product belonging to the recommended product group as the at least one recommended product from the local products of which the data are stored in the storage device 21, wherein the product recommender 236 may select the products most similar to the virtual products belonging to the recommended product group as the recommended products. In actual applications, the product recommender 236 may base on various data values of the local products, to select the products of which the data values are nearest to the virtual product's centroids of the recommended product groups as recommended products. If the above selected products have been sold out, then the products of which the data values are second nearest to the virtual product's centroids of the recommended product groups are recommended. On the analogy of this, if the newly selected products also have been sold out, then the products of which the data values are next nearest to the virtual product's centroids will be recommended.

When the input data entered by a current user using the input device 22 comprise data of the current user, and a demanded product condition, the user classifier 234 bases on the data of the current user to classify the current user to a current user group which is one of the integrated local user groups.

The product recommender 236 bases on the current user group to inquire the revised local relation matrix, so as to select a product group which has a maximum correlation coefficient with respect to the current user group and meets the demanded product condition as a recommended product group from the integrated local product groups. If the local products in the (recommended) product group which has the maximum correlation coefficient and meets the demanded product condition have been sold out, then another product group which has a second maximum correlation coefficient with respect to the current user group and meets the demanded product condition is used as the recommended product group. On the analogy of this, if the local products in the recommended product group newly selected also have been sold out, then another product group which has a next maximum correlation coefficient and meets the demanded product condition will be used as the recommended product group.

Thereafter, the product recommender 236 selects at least one product belonging to the recommended product group as the at least one recommended product from the local products of which the data are stored in the storage device 21, wherein the product recommender 236 may select the products most similar to the virtual products belonging to the recommended product group as the recommended products. In actual applications, the product recommender 236 may select the products of which the data values are nearest to the virtual product's centroids of the recommended product groups as recommended products. If the above selected products have been sold out, then the products of which the data values are second nearest to the virtual product's centroids of the recommended product groups are recommended. On the analogy of this, if newly selected products also have been sold out, then the products of which the data values are next nearest to the virtual product's centroids will be recommended.

Figure 3:
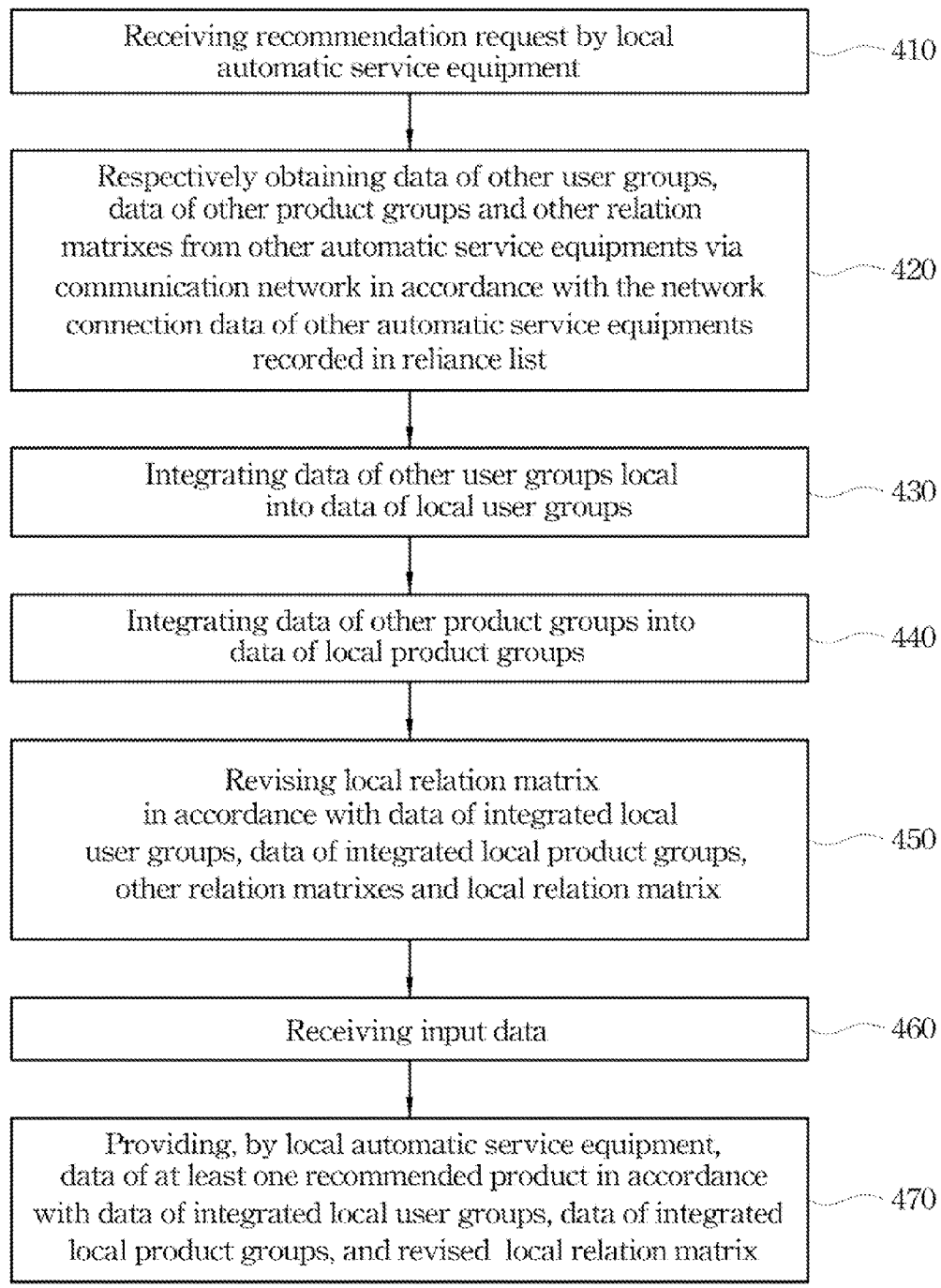
FIG. 3 is a flow chart showing a method for product recommendation according to an embodiment of the present invention.

Referring to FIG. 3, FIG. 3 is a flow chart showing a method for product recommendation according to an embodiment of the present invention. In the method for product recommendation, each automatic service equipment obtains data of user groups, data of product groups and relation matrixes between the user groups and the product groups from other automatic service equipments, and then combines data of user groups, data of product groups and a relation matrix stored in a local automatic service equipment as a base for product recommendation. The method 400 for product recommendation can be embodied in the aforementioned system for product recommendation or automatic service equipment, and also can be embodied in a computer program stored in a computer-readable recording medium, and the method 400 for product recommendation is performed after the computer program is read by a computer.

The method 400 for product recommendation is suitable for use between a plurality of automatic service equipments, such as vending machines, multi-media browsing machines, and digital bulletins, or other types of automatic service equipment providing service by using industrial personal computers. Each of the automatic service equipments is linked to other automatic service equipments via a communication network, each of the automatic service equipments having a plurality of local user groups, data of a plurality of local product groups, a local relation matrix and a reliance list stored therein.

The local user groups can be formed by clustering the local users which have ever used the local automatic service equipment. The data of each local user group are preferably data of a user's centroid used for representing data of a plurality of local users in the each local user group. An average of data of a plurality of local users in one same user group can be used as the data of the one same user group. In other words, when the data of a local user group represents an average age of 23 years old of a plurality of local users, it can be considered that there is only one 23-year-old virtual user (or referred to as a local user's centroid) existing in the local user group. However, in other embodiments, the data of a local user group can represent the age, height, weight or other user related data (which can be numericalized) of a virtual user (user's centroid) in the local user group. Besides, the embodiments of the present invention may numericalize genders, occupations, home address areas or other user related data of the respective local users, and then use the averages of the numericalized data of the local users in the same local user group as the data of the local user group to which the local users belong. Therefore, a large amount of data of users can be greatly reduced to a small amount of data of few user groups (user's centroids).

The local product groups can be formed by clustering the local products which can be provided by the local automatic service equipment. The data of each local product group are data of a product's centroid used for representing data of a plurality of local products in the each local product group. An average of data of a plurality of local products in one same product group can be used as the data of the one same product group. In other words, when a local product group contains a plurality of local product with an average capacity of 1 liter, it can be considered that there is only one virtual product (or referred to as a product's centroid) with the capacity of 1 liter existing in the local user group. However, in other embodiments, the data of a local product group can represent the weight, capacity, price or other user related data (which can be numericalized) of a virtual product (product's centroid) in the local user group. Besides, the embodiments of the present invention may numericalize brands, model numbers, model types or other product related data of the respective local products. Therefore, a large amount of data of products can be greatly reduced to a small amount of data of few product groups (product's centroids).

The relation matrix records correlation coefficients between the local user groups and the local product groups. Further, the probabilities of selecting the local product groups by the local user groups can be used as the correlation coefficients. For example, when the probability that a local user group u1 will select a local product group p1 is 0.5, the correlation coefficient between the local user group u1 and the local product group p1 can be assigned to 0.5. However, in other embodiments, other related parameters between the local user groups and the local product groups can be used as correlation coefficients, and thus the embodiments of the present invention are not limited thereto.

The reliance list comprises network connection data of the other automatic service equipments, such as IP addresses, web addresses, web domains or other data related to network connections, and is used as a base for establishing connections to the other automatic service equipments, wherein each automatic service equipment has stored therein a certificate used as a base for building the reliance list.

The method 400 for product recommendation is performed by a local automatic service equipment of the automatic service equipments, and comprises the following steps.

When the local automatic service equipment receives a recommendation request (step 410), step 420 is performed to respectively obtaining data of other user groups, data of other product groups and other relation matrixes from the other automatic service equipments via the communication network in accordance with the network connection data of the other automatic service equipments recorded in the reliance list, wherein the data of the other user groups, the data of the other product groups and the other relation matrixes obtained from the other automatic service equipments are the data of the local user groups, the data of the local product groups and the local relation matrixes respectively belonging to each of the other automatic service equipments. Further, the other user groups can be formed by clustering the other users which have ever used the respective other automatic service equipments, and the other product groups can be formed by clustering the other products which can be provided by the other automatic service equipments respectively. Hence, the number of the other user groups in the other automatic service equipments is much smaller than that of the other users therein, and the number of the other product groups in the other automatic service equipments is much smaller than that of the other products therein. Further, the data of the other user groups and the data of the other product groups are preferably represented by the data of user's centroids and the data of product's centroids respectively. Besides, the data of the other user groups stored in the respective other automatic service equipments are totally the same clustered data, partially the same clustered data or totally different clustered data; and the data of the other product groups stored in the automatic service equipments are totally the same clustered data, partially the same clustered data or totally different clustered data. Thus, by clustering the data of users and the data of products and representing them by the data of their centroids, their data size can be greatly reduced, so that the data of the other user groups and the data of product groups can be transmitted rapidly through a network. Further, the relation matrixes record the correlation coefficients between the other user groups and the other product groups, and their sizes also are not large, and can be transmitted rapidly through the network.

In step 430, the data of the other user groups are integrated into the data of the local user groups in the local automatic service equipment. Step 430 can base on the user's centroids of the local and other user groups to perform integration, and merges the user groups of which the user's centroids are located closely. In other words, step 430 can integrate the local and other user groups of which the data attributes are similar as new local user groups, and base on the data of the local and other user groups to compute user's centroids of the new local user groups as the data of the integrated (new) local user groups. Further, the data of each of the local and other user groups are corresponding to the data of one of the integrated user groups.

In step 440, the data of the other product groups are integrated into the data of the local product groups in the local automatic service equipment. Step 440 can base on the product's centroids of the local and other product groups to perform integration, and merge the product groups of which the product's centroids are located closely. In other words, step 440 also can integrate the local and other product groups of which the data attributes are similar as new local product groups, and base on the data of the local and other product groups to compute product's centroids of the new local product groups as the data of the integrated (new) local product groups. Further, the data of each of the local and other product groups are corresponding to the data of one of the integrated product groups.

In step 450, the local relation matrix is revised in accordance with the data of the integrated local user groups, the data of the integrated local product groups, the other relation matrixes and the local relation matrix, wherein step 450 enables the revised local relation matrix to record the correlation coefficients between the integrated first user groups and the integrated first product groups by revising.

In step 460, input data are received, wherein the input data can be received by an input device such as a mouse, a keyboard, a touch panel or any other input device provided for a user to input data.

In step 470, the local automatic service equipment provides data of at least one recommended product in accordance with the data of the integrated local user groups, the data of the integrated local product groups, and the revised local relation matrix. Therefore, the data of the recommended product can be used to assist users to perform product selection through the local automatic service equipment.

The local automatic service equipment can record the information of users and the products selected by the users as a base for product recommendation. Thus, the local automatic service equipment has stored therein data of a plurality of local products or users, wherein each of the local products is classified to one of the local product groups. Further, when the data of the other product groups are integrated into the data of the local product groups stored in the local automatic service equipment (step 440), the group integration module 232 classifies each of the local products to one of the integrated product groups. Each of the local users is classified to one of the local users groups. When the data of the other user groups are integrated into the data of the local user groups stored in the local automatic service equipment (step 450), each of the local users is classified to one of the integrated user groups.

Further, step 470 may base on various data inputted by users to perform recommendation. Thus, when the input data entered by a current user using the input device 22 comprise data of the current user, step 470 of providing the data of the at least one recommended product may comprise the steps of: classifying the current user to a current user group which is one of the integrated local user groups; and inquiring the revised local relation matrix in accordance with the current user group, thereby selecting a product group having a maximum correlation coefficient with respect to the current user group as a recommended product group from the integrated local product groups. If the local products in the (recommended) product group having the maximum correlation coefficient have been sold out, then another product group having a second maximum correlation coefficient with respect to the current user group is used as the recommended product group. On the analogy of this, if the local products in the recommended product group newly selected also have been sold out, then another product group having a next maximum correlation coefficient will be used as the recommended product group. Thereafter, at least one product belonging to the recommended product group is selected as the at least one recommended product from the local products of which the data are stored in the local automatic service equipment, wherein the products most similar to the virtual products belonging to the recommended product group can be selected as the recommended products. In actual applications, in accordance with various data values of the local products, the products of which the data values are nearest to the virtual product's centroids of the recommended product groups can be selected as recommended products. If the above selected products have been sold out, then the products of which the data values are second nearest to the virtual product's centroids of the recommended product groups are recommended. On the analogy of this, if the newly selected products also have been sold out, then the products of which the data values are next nearest to the virtual product's centroids will be recommended.

When the input data entered by a current user using the input device comprise data of the current user, and a demanded product condition, step 470 of providing the data of the at least one recommended product may comprise the steps of: classifying the current user to a current user group which is one of the integrated local user groups; and inquiring the revised local relation matrix in accordance with the current user group, thereby selecting a product group which has a maximum correlation coefficient with respect to the current user group and meets the demanded product condition as a recommended product group from the integrated local product groups. If the local products in the (recommended) product group which has the maximum correlation coefficient with respect to the current user group and meets the demanded product condition have been sold out, then another product group which has a second maximum correlation with respect to the current user group and meets the demanded product condition coefficient is used as the recommended product group. On the analogy of this, if the local products in the recommended product group newly selected also have been sold out, then another product group which has a next maximum correlation coefficient and meets the demanded product condition coefficient will be used as the recommended product group. Thereafter, at least one product belonging to the recommended product group is selected as the at least one recommended product from the local products of which the data are stored in the local automatic service equipment, wherein the products most similar to the virtual products belonging to the recommended product group can be selected as the recommended products. In actual applications, in accordance with various data values of the local products, the products of which the data values are nearest to the virtual product's centroids of the recommended product groups can be selected as recommended products. If the above selected products have been sold out, then the products of which the data values are second nearest to the virtual product's centroids of the recommended product groups are recommended. On the analogy of this, if the newly selected products also have been sold out, then the products of which the data values are next nearest to the virtual product's centroids will be recommended.

Further, the method 400 for product recommendation may base on the data of the products selected by the users to perform a reclustering step onto the local user groups and the local product groups. Hence, the method 400 for product recommendation may comprise the steps of: receiving data of a confirmed and selected product; registering the data of the current user contained in the input data into the data of the local users belonging to the local automatic service equipment; recording the data of the confirmed and selected product into the data of the local products belonging to the local automatic service equipment; reclustering the data of the local users after the current user is registered, thereby updating the data of the local user groups belonging to the local automatic service equipment; reclustering the data of the local products after the confirmed and selected product is registered, thereby updating the data of the local product groups belonging to the local automatic service equipment; and revising the local relation matrix in accordance with the data of the local user groups updated and the data of the local product groups updates, thereby enabling the revised relation matrix to record the correlation coefficients between the updated local user groups and the updated local product groups. Consequently, after more users utilize the local automatic service equipment for selecting products, the recommendation made by the local automatic service equipment will be more accurate.

It can be known from the aforementioned embodiments of the present invention that the applications of the present invention have the following advantages. Each automatic service equipment may base on data of other automatic service equipments to perform recommendation without needing to install a central server additionally for performing the computation of product recommendation, thus avoiding the shortcoming of the automatic service equipment failing to perform the recommendation function due to the central sever down or the interruption of a network linked to the central server. Further, the data obtained form the other automatic service equipments are clustered data, and are extremely small in size, and thus can transmitted rapidly through the network. Further, when the computation of product recommendation is performed by using the clustered data, it does not need strong operation capability to perform the computation of product recommendation since the clustered data are extremely small in size. In other words, the present invention is suitable for use in various types of automatic service equipment using industrial personal computers with less processing capabilities.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for product recommendation, comprising:
a plurality of automatic service equipments, wherein each of the automatic service equipments is linked to other automatic service equipments via a communication network, each of the automatic service equipments comprising:
  a storage device in which data of a plurality of first user groups, data of a plurality of first product groups, a relation matrix and a reliance list are stored, wherein the relation matrix is used to record correlation coefficients between the first user groups and the first product groups, and the reliance list comprises network connection data of the other automatic service equipments;
  an input device used for receiving input data; and
  a processing device electrically connected to the storage device and the input device, the processing device comprising modules that when executed by the processing device cause the processing device to:
    obtain, via a data obtaining module, data of other first user groups, data of other first product groups and other relation matrixes from the other automatic service equipments via the communication network in accordance with the network connection data of the other automatic service equipments recorded in the reliance list;
    integrate, via a group integrating module, the data of the other first user groups into the data of the first user groups, and integrating the data of the other first product groups into the data of the first product groups;
    revise, via a matrix-revising module, the relation matrix in accordance with the data of the integrated first user groups, the data of the integrated first product groups, the other relation matrixes and the relation matrix, thereby enabling the revised relation matrix to record the correlation coefficients between the integrated first user groups and the integrated first product groups; and
    provide, via a recommendation module, data of at least one recommended product in accordance with the input data, the data of the integrated first user groups, the data of the integrated first product groups, and the revised relation matrix.

2. The system as claimed in claim 1, wherein the storage device of each of the automatic service equipments has a certificate, and the reliance list is built in accordance with the certificate.

3. The system as claimed in claim 1, wherein the automatic service equipments respectively store the data of the first user groups, which are totally the same data, partially the same data or totally different data; and the automatic service equipments respectively store the data of the first product groups, which are totally the same data, partially the same data or totally different data.

4. The system as claimed in claim 1, wherein the data of each of the first user groups and the data of the other first user groups are corresponding to one of the data of the integrated first user groups; and the data of each of the first product groups and the data of the other first product groups are corresponding to one of the data of the integrated first product groups.

5. The system as claimed in claim 1, wherein the storage device of each of the automatic service equipments has data of a plurality of first products stored therein, and each of the first products is classified to one of the first product groups, and, when the data of the other first product groups are integrated into the data of the first product groups, the group integration module classifies each of the first products to one of the integrated first product groups.

6. The system as claimed in claim 5, wherein the input data comprises data of a current user, the recommendation module of each of the automatic service equipments comprising:
  a user classifier used for classifying the current user to a current user group which is one of the integrated first user groups in accordance with data of the current user; and
  a product recommender used for selecting a recommended product group from the integrated first product groups in accordance with the current user group, and selecting at least one product belonging to the recommended product group as the at least one recommended product from the first products, wherein the recommended product group has a maximum correlation coefficient with respect to the current user group.

7. The system as claimed in claim 5, wherein the input data comprises data of a current user and a demanded product condition, the recommendation module of each of the automatic service equipments comprising:
  a user classifier used for classifying the current user to a current user group which is one of the integrated first user groups in accordance with data of the current user; and
  a product recommender used for selecting a recommended product group from the integrated first product groups in accordance with the current user group, and selecting at least one product belonging to the recommended product group as the at least one recommended product from the first products, wherein the recommended product group has a maximum correlation coefficient with respect to the current user group and meets the demanded product condition.

8. The system as claimed in claim 1, wherein the storage device of each of the automatic service equipments has data of a plurality of first users and data of a plurality of first products stored therein, and each of the first users is classified to one of the first user groups, and each of the first products is classified to one of the first product groups; and
  when the data of the other first user groups are integrated into the data of the first user groups, the group integration module classifies each of the first users to one of the integrated first user groups, and, when the data of the other first product groups are integrated into the data of the first product groups, the group integration module classifies each of the first products to one of the integrated first product groups.

9. The system as claimed in claim 1, wherein the data of each of the first user groups are data of a user's centroid used for representing data of a plurality of first users in the each of the first user groups; and
  the data of each of the first product groups are data of a product's centroid used for representing data of a plurality of first products in the each of the first product groups.

10. The system as claimed in claim 9, wherein the group integration module further comprising:

integrating the data of the other first user groups into the data of the first user groups in accordance with the user's centroids of the automatic service equipments and merging the first user groups of which the user's centroids are located closely; and integrating the data of the other first product groups into the data of the first product groups in accordance with the product's centroids of the automatic service equipments and merging the first product groups of which the product's centroids are located closely.

11. A method for product recommendation comprising:

a plurality of automatic service equipments with processing devices, wherein each of the automatic service equipments is linked to other automatic service equipments via a communication network;

each of the automatic service equipments having a plurality of first user groups, data of a plurality of first product groups, a relation matrix and a reliance list stored therein, wherein the reliance list comprises network connection data of the other automatic service equipments;

recording, via the processing devices, correlation coefficients between the first user groups and the first product groups based on a relation matrix;

recommending products by a processing device of a local automatic service equipment of the automatic service equipments;

respectively obtaining data, via the processing devices, of other first user groups, data of other first product groups and other relation matrixes from the other automatic service equipments via the communication network in accordance with the network connection data of the other automatic service equipments recorded in the reliance list;

integrating, via the processing devices, the data of the other first user groups into the data of the first user groups in the local automatic service equipment, and integrating the data of the other first product groups into the data of the first product groups in the local automatic service equipment;

revising, via the processing devices, the relation matrix in accordance with the data of the integrated first user groups, the data of the integrated first product groups, the other relation matrixes and the relation matrix, thereby enabling the revised relation matrix to record the correlation coefficients between the integrated first user groups and the integrated first product groups; and receiving input data and providing data of at least one recommended product in accordance with the data of the integrated first user groups, the data of the integrated first product groups, and the revised relation matrix.

12. The method as claimed in claim 11, wherein each of the automatic service equipments has a certificate, and the reliance list is built in accordance with the certificate.

13. The method as claimed in claim 11, wherein the automatic service equipments respectively store the data of the first user groups, which are totally the same data, partially the same data or totally different data; and the automatic service equipments respectively store the data of the first product groups, which are totally the same data, partially the same data or totally different data.

14. The method as claimed in claim 11, wherein the data of each of the first user groups in the local automatic service equipment and the data of the other first user groups in the other automatic service equipments are corresponding to one of the data of the integrated first user groups; and the data of each of the first product groups in the local automatic service equipment and the data of the other first product groups in the other automatic service equipments are corresponding to one of the data of the integrated first product groups.

15. The method as claimed in claim 11, wherein the local automatic service equipment has data of a plurality of first products stored therein, and each of the first products is classified to one of the first product groups in the local automatic service equipment, and, when the data of the other first product groups are integrated into the data of the first product groups in the local automatic service equipment, the group integration module classifies each of the first products to one of the integrated first product groups.

16. The method as claimed in claim 15, wherein the input data comprises data of a current user, and the step of providing data of at least one recommended product comprises:

classifying the current user to a current user group which is one of the integrated first user groups in accordance with data of the current user; and selecting a recommended product group from the integrated first product groups in accordance with the current user group, and selecting at least one product belonging to the recommended product group as the at least one recommended product from the first products, wherein the recommended product group has a maximum correlation coefficient with respect to the current user group.

17. The method as claimed in claim 15, wherein the input data comprises data of a current user and a demanded product condition, and the step of providing data of the recommended product comprises:

classifying the current user to a current user group which is one of the integrated first user groups in accordance with data of the current user; and selecting a recommended product group from the integrated first product groups in accordance with the current user group, and selecting at least one product belonging to the recommended product group as the at least one recommended product from the first products, wherein the recommended product group has a maximum correlation coefficient with respect to the current user group and meets the demanded product condition.

18. The method as claimed in claim 11, wherein each of the automatic service equipments has data of a plurality of first users and data of a plurality of first products stored therein, and each of the first users is classified to one of the first user groups, and each of the first products is classified to one of the first product groups; and when the data of the other first user groups are integrated into the data of the first user groups, the group integration module classifies each of the first users to one of the integrated first user groups, and, when the data of the other first product groups are integrated into the data of the first product groups, the group integration module classifies each of the first products to one of the integrated first product groups.

19. The method as claimed in claim 11, wherein the data of each of the first user groups are data of a user's centroid used for representing data of a plurality of first users in the each of the first user groups; and the data of each of the first product groups are data of a product's centroid used for representing data of a plurality of first products in the each of the first product groups.

20. The method as claimed in claim 19, wherein the step of integrating the data of the other first user groups into the data of the first user groups and integrating the data of the other first product groups into the data of the first product groups further comprises:

integrating the data of the other first user groups into the data of the first user groups in accordance with the user's centroids of the automatic service equipments and merging the first user groups of which the user's centroids are located closely; and integrating the data of the other first product groups into the data of the first product groups in accordance with the product's centroids of the automatic service equipments and merging the first product groups of which the product's centroids are located closely.

21. An automatic service equipment, comprising:

a network device used for establishing a connection with a communication network;

a storage device in which data of a plurality of local user groups, data of a plurality of local product groups, a local relation matrix and a reliance list are stored, wherein the local relation matrix is used to record correlation coefficients between the local user groups and the local product groups, and the reliance list comprises network connection data of a plurality of other automatic service equipments;

an input device used for receiving input data; and a processing device electrically connected to the storage device and the input device, and the processing device comprises:

a data obtaining module used for respectively obtaining data of a plurality of other user groups, data of a plurality of other product groups and a plurality of other relation matrixes from the other automatic service equipments via the communication network in accordance with the network connection data of the other automatic service equipments recorded in the reliance list, wherein the other relation matrixes are used to record correlation coefficients between the other user groups and the other product groups;

a group integration module used for integrating the data of the other user groups into the data of the local user groups, and integrating the data of the other product groups into the data of the local product groups;

a matrix-revising module used for revising the local relation matrix in accordance with the data of the integrated local user groups, the data of the integrated local product groups, the other relation matrixes and the local relation matrix, thereby enabling the revised local relation matrix to record the correlation coefficients between the integrated local user groups and the integrated local product groups; and a recommendation module used for providing data of at least one recommended product in accordance with the data of the integrated local user groups, the data of the integrated local product groups, and the revised relation matrix.

22. A non-transitory computer-readable storage medium storing a computer program, the computer program when executed by one or more processing devices of the one or more automatic service equipments performs method steps for product recommendation the method steps comprising:

linking automatic service equipments to the other automatic service equipments via a communication network, where each of the automatic service equipments has a plurality of first user groups, data of a plurality of first product groups, a relation matrix and a reliance list stored therein, wherein the relation matrix is used to record correlation coefficients between the first user groups and the first product groups, and the reliance list comprises network connection data of the other automatic service equipments;

respectively obtaining data of other first user groups, data of other first product groups and other relation matrixes from the other automatic service equipments via the communication network in accordance with the network connection data of the other automatic service equipments recorded in the reliance list;

integrating the data of the other first user groups into the data of the first user groups in the local automatic service equipment, and integrating the data of the other first product groups into the data of the first product groups in the local automatic service equipment;

revising the relation matrix in accordance with the data of the integrated first user groups, the data of the integrated first product groups, the other relation matrixes and the relation matrix, thereby enabling the revised relation matrix to record the correlation coefficients between the integrated first user groups and the integrated first product groups; and receiving input data and providing data of at least one recommended product in accordance with the data of the integrated first user groups, the data of the integrated first product groups, and the revised relation matrix.

\* \* \* \* \*